United States Patent [19]

Kimura

[11] 4,251,821
[45] Feb. 17, 1981

[54] CHARACTER RECORDING DEVICE

[75] Inventor: Tsutomu Kimura, Asaka, Japan

[73] Assignee: Fuji Photo Film Co., Ltd., Minami-ashigara, Japan

[21] Appl. No.: 83,713

[22] Filed: Oct. 11, 1979

[30] Foreign Application Priority Data

Oct. 16, 1978 [JP] Japan .................. 53-127174

[51] Int. Cl.³ .................. G01D 9/42; B41B 13/00; H04N 1/04
[52] U.S. Cl. .................. 346/108; 354/5; 358/285
[58] Field of Search .................. 346/108; 354/5; 358/285, 293

[56] References Cited

U.S. PATENT DOCUMENTS

| 3,479,453 | 11/1969 | Townsend | 358/285 X |
|---|---|---|---|
| 3,716,660 | 2/1973 | Friedman | 358/285 X |
| 3,882,509 | 5/1975 | Newton et al. | 354/5 |
| 3,946,150 | 3/1976 | Grafton | 358/285 |
| 4,032,888 | 6/1977 | Broyles et al. | 358/285 X |
| 4,032,912 | 6/1977 | Wood | 346/110 R X |
| 4,037,231 | 7/1977 | Broyles et al. | 354/5 X |
| 4,040,096 | 8/1977 | Starkweather | 358/293 X |

Primary Examiner—George H. Miller, Jr.
Attorney, Agent, or Firm—Sughrue, Rothwell, Mion, Zinn and Macpeak

[57] ABSTRACT

A dot character recording device in which a recording surface is scanned with a laser beam modulated in accordance with the dot patterns of characters to be recorded. The time width of the modulating signal is adjusted in accordance with the beam position in order to maintain a constant scanning line and hence character dot width. Preferably, the pulse width of the modulating signal is increased in the scanning direction at recording positions where the density of the beam would otherwise be low so as to apply additional optical energy.

2 Claims, 9 Drawing Figures

CHARACTER RECORDING DEVICE

BACKGROUND OF THE INVENTION

This invention relates to character recording devices in which scanning is effected with a light beam to record characters or the like as dot patterns.

More particularly, the invention relates to a character recording device in which the pulse width of a dot signal is varied in correspondence with a recording position in a picture to be recorded.

In a character recording device in which, while a recording material is scanned with a light beam such as a laser beam, the light beam is subjected to on-off modulation with the aid of a character dot signal thereby to record characters or the like as dot patterns, it is desirable that the density of the light beam be constant irrespective of its position on the recording material. However, in practice, as the light beam is moved upon the recording material, the density thereof changes for reasons to be described below. Accordingly, the recorded dots are not uniform in size as the scanning lines forming the recorded picture are not uniform in width. Especially, for scanning with a light beam, as the recording position becomes remote from the point of the recording material which corresponds to the central axis of the optical system, the density of the light beam received by the recording material decreases. As a result, the dot size in the peripheral portion of the recorded picture is reduced. That is, the width of the recorded picture is decreased.

The difference in the density of the light beam depends on the design or manufacturing accuracy of the optical system. However, in general, it is considered that the difference is due to one or more of the following reasons:
(1) The light beam scanning speed in the central portion of a region to be recorded is different from that in the peripheral portion thereof.
(2) The incident angle of the light beam with respect to the recording material in the central portion of the region to be recorded is different from that in the peripheral portion.
(3) In the case where the recording material has a flat recording surface, it is difficult to allow the focal plane of the light beam to coincide with the surface of the recording material over the entire region to be recorded. Therefore, the diameter of the light beam varies as the recording position changes.
(4) The configuration of the light beam is irregular because of abberations in the optical system.

Accordingly, an object of this invention is to provide a character recording device which is free from the variations in the dot size with changes of the recording position on a picture to be recorded caused by any of the above-described factors.

Another object of the invention is to provide a character recording device in which characters or the like are recorded with dots uniform in size over the entire surface of a picture.

SUMMARY OF THE INVENTION

In a recording device of the invention, the pulse width of a dot signal is increased in the scanning direction of the light beam at recording positions where the density of the light beam is lower so as to apply more optical energy to the recording position whereby the size of dots is made substantially uniform throughout the entire surface of the recorded picture.

Also, the foregoing objects and other objects of the invention have been achieved by the provision of a character recording device for recording characters or the like with a dot pattern by scanning with a light beam which, according to the invention, includes means for varying the pulse width of a dot signal in correspondence with the scanning position of the light beam.

DESCRIPTION OF THE PREFERRED EMBODIMENTS

Figure 1:
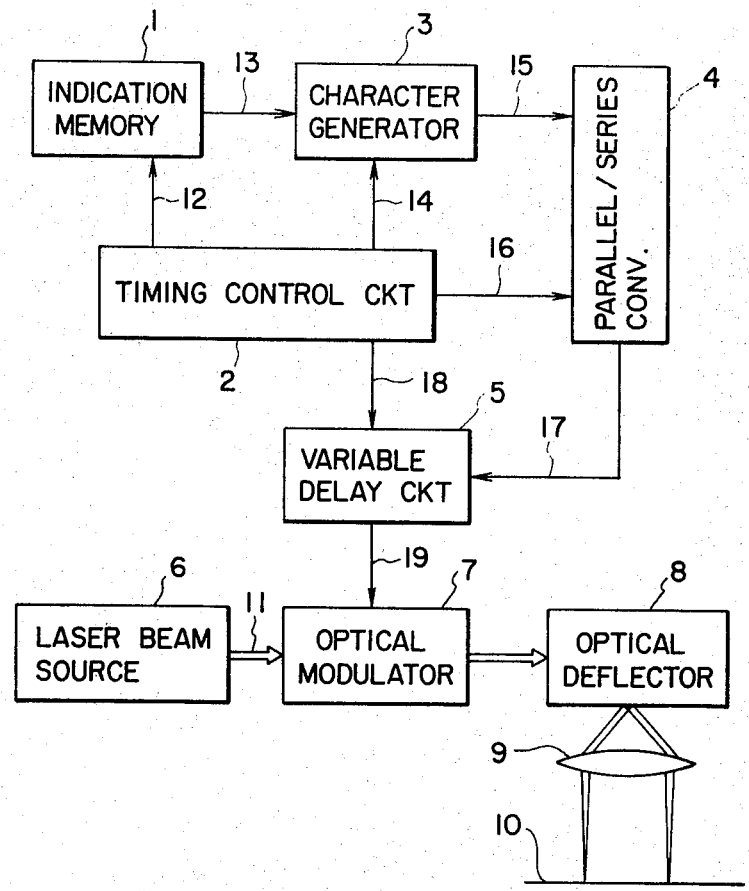
FIG. 1 is a block diagram showing one example of a character recording device according to the invention.

FIG. 1 is a block diagram showing an example of a character recording device according to the invention. A specific unique feature of the character recording device of the invention resides in that it includes means, namely a variable delay circuit 5 in FIG. 1, for varying the pulse widths of dots forming characters or the like in response to the recording positions of characters or the like.

First, a conventional character recording device having no delay means will be described with reference to FIG. 1. The following description relates primarily to the flow of a dot signal for generating a character. All the processes required to record the characters are omitted. In other words, the generation of input signals corresponding to character patterns to be recorded, control of the input signals, and a laser optical system are not described as such devices are conventional and are commercially available.

In FIG. 1, reference numeral 1 designates an indication memory. It is assumed that input signals or indication data for one line of characters are symbols to be recorded have been stored in the form of codes in the indication memory 1 from a magnetic tape unit by means of a control device (not shown).

The indication memory 1 is controlled by a control signal 12 from a timing control circuit 2. A character generator 3 is preferrably a character signal generating read-only memory. The character generator 3 receives a character code signal on line 13 read out of the indication memory 1 and a control signal on line 14 from the timing control circuit 2 to enable it to generate a parallel dot signal on line 15. The parallel dot signal on line 15 is applied to a parallel-to-serial conversion circuit 4 where it is converted into a serial dot signal on line 17 in accordance with a control signal on line 16. The serial dot signal on line 17 is applied directly to an optical modulator 7 where a laser beam 11 produced by laser beam source 6 is subjected to on-off modulation in response to the serial dot signal on line 17. The laser beam thus modulated is one-dimensionally or two-dimensionally deflected by an optical deflector 8 and is then focussed on a recording material 10 by a focussing lens 9. Thus, the recording material 10 is one-dimensionally or two-dimensionally (for instance, as a raster) scanned with the on-off-modulated laser beam 11 as a result of which a pattern such as a character is recorded with dots.

In scanning the recording material with the laser beam 11, in order to determine the start point of the dot signal on a scanning line of the scanning laser beam or in order to control the intervals of the dot signals, the laser beam 11, after being deflected by the optical deflector 8, is either detected at a predetermined position or laser beam scanning slits disposed at equal intervals are detected and the resultant detection signal is utilized for timing the generation of dot signals. Signals generated using this timing signal can be used as the control signals produced by the timing control circuit 2 so that therefore the serial dot signal on line 17 can be produced in correspondence to a correct position on the recording material 10.

Figure 2:
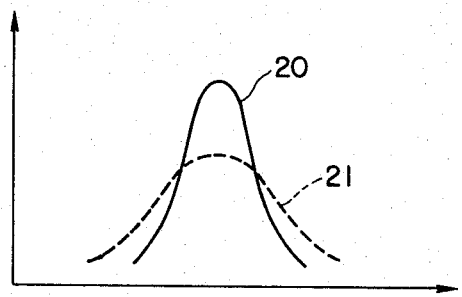
FIG. 2 is a diagram showing an example of the variations in intensity distribution of light beams according to recording position.

Variations in the intensity distribution of the laser beam 11 on the recording material 10 will now be described. The laser beam 11 is focussed on the recording material 10. It is assumed that the intensity distribution thereof is substantially a Gaussian distribution. Furthermore, it is assumed that the diameter of a dot recorded corresponds to a region where the intensity of the laser beam 11 is higher than a certain threshold value. Typically, the intensity distribution of the laser beam 11 on the recording material is as shown in FIG. 2 in which the solid line 20 represents the central portion of a picture to be recorded, and the broken line 21 corresponds to peripheral portions of the picture. That is, in the central portion, the laser beam 11 is focussed on the recording material 10, the diameter of the laser beam 11 is small, and the intensity is high while in the peripheral portion, the diameter of the laser beam 11 is large and the maximum value of the intensity is small because of the above-described factors such as, for instance, the defocussing problem.

Figure 3A:
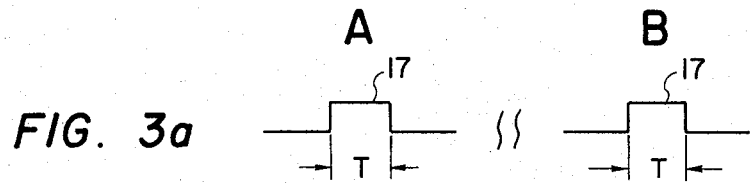
FIGS. 3a–3c are diagrams utilized for a description of the variations of dot size according to recording positions.
Figure 3B:
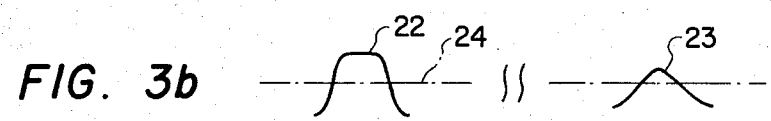
Figure 3C:
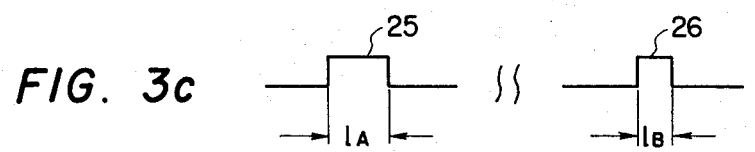

The case where the laser beam has an intensity distribution in the central portion different from that in the peripheral portion and where the beam is subjected to on-off modulation by the optical modulator 7 will be described. FIGS. 3a–3c are diagrams useful for describing the relation between the serial dot signal, the light beam intensity, and the diameter of a dot recorded in the central and the peripheral portions. FIG. 3a shows, in a simplified manner, the configurations of dot signals on line 17 having a pulse width, in the central portion A and the peripheral portion B. In FIG. 3a, the abscissa indicates time while the ordinate shows the level of the electrical signal, the level being raised when light passes through the optical modulator 7.

FIG. 3b shows the distribution of light energy applied to the recording material 10 in correspondence with the serial dot signals 17. The abscissa shows the position of the laser beam 10 in the scanning direction while the ordinate shows the magnitude of light energy. In FIG. 3b, the curve 22 corresponds to the integration value of light energy at a position to which the solid line 20 in FIG. 2 has been moved in the direction of the abscissa for a predetermined period of time while the curve 23 corresponds to the broken line 21 in FIG. 2. In general, a binary picture recording material is high in this value. That is, the recording material 10 has a light energy threshold value above which recording is achieved.

The threshold value is indicated by a one-dot chain line 24 in FIG. 3b. The recording is made on the recording material at a position where the light energy is higher than the threshold value of FIG. 3b. Accordingly, as shown in FIG. 3c, the diameter $1_A$ of a dot 25 recorded in the central portion A of the picture is large but the diameter $1_B$ of a dot 26 recorded in the peripheral portion B is small. In FIG. 3c, the abscissa corresponds to that in FIG. 3b and the ordinate shows the variations in density of dots recorded where it is assumed that the ordinate indicates the density so that the recording material is of the negative type. However, the opposite or positive type of recording material can be used as well.

As was described above, with a conventional character recording device, the size of dots recorded in the central portion of the picture is different from that of dots recorded in the peripheral portion so that the recorded picture is low in quality. Furthermore, in such a conventional device the picture may not be recorded at all in the peripheral portion.

Particular features of a character recording device according to the invention will be described. In the character recording device of the invention, the serial dot signal on line 17 in FIG. 1 is not directly applied to the optical modulator 7. Instead, a serial dot signal on line 19 is obtained with the variable delay circuit 5. More specifically, with the variable delay circuit 5, the serial dot signal on line 19 is obtained by increasing the pulse width of the serial dot signal on line 17 as long as required for correcting the reduced size of the recording dot in the peripheral portion. The signal on line 19 is applied to the optical modulator 7.

Figure 4A:
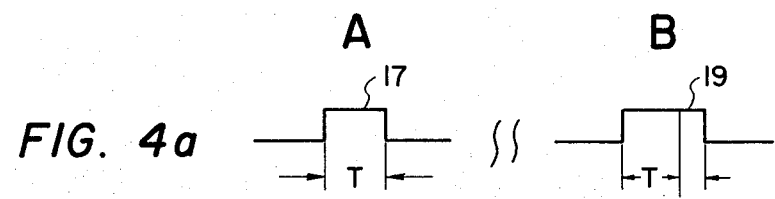
FIGS. 4a–4c are diagrams utilized for a description of the coincidence of dot sizes when the character recording device of the invention is employed.
Figure 4B:
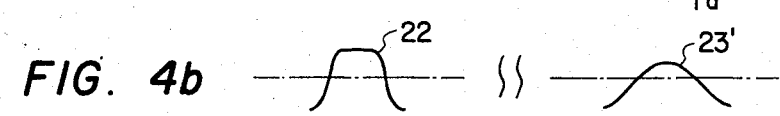
Figure 4C:
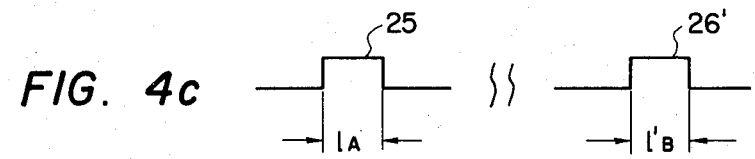

FIGS. 4a–4c are a series of diagrams useful for describing the effects of the present invention in which FIGS. 4a, 4b and 4c correspond respectively to FIGS. 3a, 3b and 3c. In FIGS. 4a–4c, the region corresponding to the central portion A is substantially the same as that of FIG. 3. In FIGS. 4a–4c, the serial dot signal on line 19 produced by increasing the pulse width of the serial dot signal on line 17 is indicated in the region corresponding to the peripheral portion B. As indicated in FIGS. 4a–4c, if the time width of the serial dot signal on line 17 is T, then the time width of the pulse-width-increased serial dot signal on line 19 is T+Td, where Td is the increased time. The curve 23' of FIG. 4b indicates the distribution of light energy applied to the recording material 10 in correspondence with the pulse-width-increased serial dot signal on line 19 while reference numeral 26' in FIG. 4c designates a dot which is recorded in response to the curve 23', the diameter $1_{B'}$ of the dot being equal to the diameter $1_A$ of a dot 25 in the central portion. As is apparent from FIGS. 4a–4c, if the amount of the increase Td of the serial dot signal on line 19 is suitably selected so that the optical modulation is carried out with this signal, then the sizes of recorded dots can be made substantially constant over all the picture.

Figure 5:
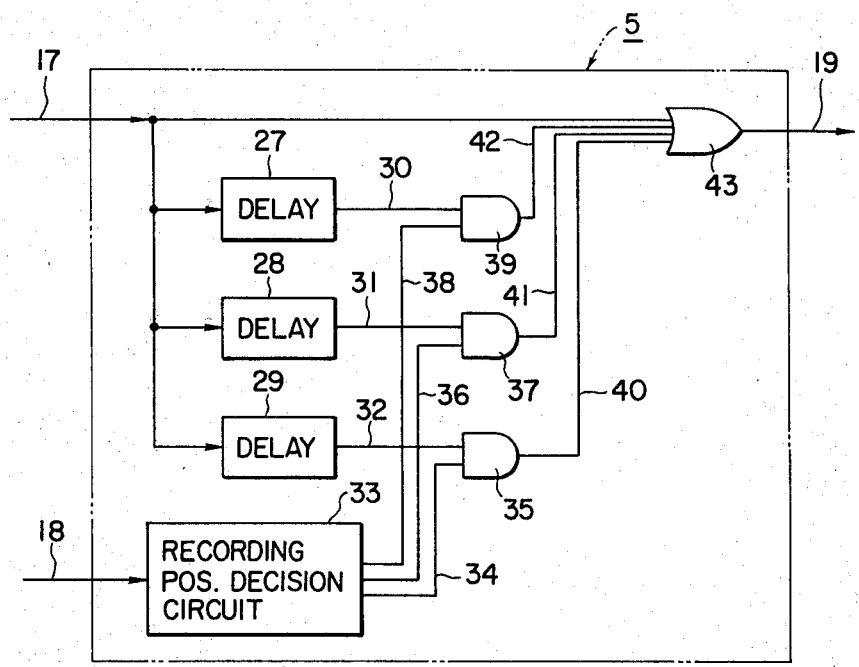
FIG. 5 is a block diagram showing one example of a variable delay circuit employed in the device of the invention.

The variable delay circuit 5 for generating the pulse-width-increased serial dot signal on line 19 will next be described. In the variable delay circuit 5, as shown in FIG. 5, for instance, the amount of increment is changed in three steps. The serial dot signal on line 17 applied to the variable delay circuit 5 is applied to an OR circuit 43 and to delay means 27, 28 and 29. These delay means may be of any conventional suitable type. The signal applied to the delay means 27, 28 and 29 is coupled out as delayed serial dot signals on lines 30, 31 and 32 which are delayed by delay times $Td_1$, $Td_2$ and $Td_3$, respectively. In this case, $Td_1 < Td_2 < Td_3$.

A recording position signal on line 18 from the timing control circuit 2 in FIG. 1 is applied to a recording position decision circuit 33 in the variable delay circuit 5. The recording position decision circuit 33 operates as follows. When the scanning or recording position of the laser beam 11 is in the peripheral portion of the picture, the delayed select signal on line 34 thereof is raised to a logic level "1" to open a gate 35 so that a delayed serial dot signal on line 32 passes through the gate 35 the output of which is applied as a delayed serial dot signal on line 40 to the OR circuit 43. When the recording position is in the middle portion inside of the peripheral portion, the delay select signal on line 34 is set to a logic level "0" to thereby close the gate 35 while the delay select signal online 36 is raised to the logic level "1" to open a gate 37 so that a delayed serial dot signal on line 31 passes through the gate 37 and is applied as a delayed serial dot signal on line 41 to the OR circuit 43.

When the recording position is further shifted toward the central portion the delay select signals on lines 34 and 36 are set to the logic level "0" to thereby close the gates 35 and 37, respectively, while a delay select signal on line 38 is raised to the logic level "1" to open a gate 39 so that a delayed serial dot signal 30 passes through the gate 39 and is applied as a delayed serial dot signal on line 42 to the OR circuit 43. When the recording position is further shifted toward the central portion, that is when the recording position is in the central portion, all of the delay select signals are set to the logic level "0", so that only the serial dot signal 17 is applied to the OR circuit 43.

As described above, the corresponding delay select signals are produced separately according to the recording positions. Therefore, various delayed serial dot signals are added to the serial dot signal 17 by means of the OR circuit as a result of which the pulse-width-increased serial dot signal on line 19, which is variable in pulse width, is provided in correspondence with the recording position. More specifically, when the recording position is in the peripheral portion, a pulse having a time width of $T+Td_3$ is produced. When the recording position is shifted inwardly, then a pulse having a time width of $T+Td_2$ is provided. When the recording position is further shifted inwardly, then a pulse having a time width of $T+Td_1$ is produced. Finally, when the recording position is in the central portion, a pulse having a time width of T is delivered.

In the above-described embodiment of the invention, the pulse width of the serial dot signal is changed in four steps. Generally, with the present invention, the pulse width is changed at least in two steps, thereby to make the size of dots forming recorded characters or the like substantially constant. Any of a member of commercially available delay elements can be employed as the delay means in FIG. 5. Instead of the delay element, a monostable multivibrator may be employed so that the signal is produced for a predetermined period of time as indicated by the trailing edge of the serial dot signal on line 17. All that is required for the recording position decision circuit is the provision of digital comparator circuits which compare the count value of a counter counting the dot signals or the scanning line signals with a predetermined value thereby to produce the delay select signals. The aforementioned set value and delay time is determined according to the particular character recording device employed and the recording material chosen. The appropriate data may be determined by observing a picture which has been recorded through optical modulation with a predetermined dot width. Alternatively, the data may be determined from a variable dot size curve which may be obtained by scanning a recorded picture with a densitometer or the like.

The above-described variations of the pulse width in the central and peripheral portions of the picture may be utilized not only in the scanning line direction but also in a direction perpendicular thereto. That is, in the case where the invention is utilized for the scanning line direction only, the scanning line is divided suitably from the start to the end so as to vary the pulse width of the serial dot signals. This procedure can be applied as well to the case where the recording material is moved in a direction perpendicular to the scanning line. However, in the case where the light beam scanning is effected two-dimensionally, it is preferable that the pulse width of all of the serial dot signals for the scanning lines in the peripheral portion of the picture be longer than the pulse width of the serial dot signals for the scanning lines in the central portion. In other words, it is preferable to increase the pulse width of the serial dot signals in correspondence to the distance from the center of the picture.

What is claimed is:

1. A character recording device comprising:
   means for scanning effected with a light beam;
   means for modulating said light beam in accordance with a dot signal to record characters or the like as dot patterns; and
   means for varying the pulse width of said dot signal in correspondence with a scanning position of said light beam.

2. The character recording device as claimed in claim 1 wherein said means for varying the pulse width of said dot signal comprises:
   a plurality of delay means for delaying said dot signal;
   means for selecting signals produced by said delay means in correspondence to the scanning positions of said light beam; and
   an OR circuit for receiving said dot signal and a selected one of said signals produced by said delay means.

* * * * *